United States Patent
Khlat et al.

(10) Patent No.: US 10,560,867 B2
(45) Date of Patent: Feb. 11, 2020

(54) REDUCING INTERMODULATION DISTORTION IN A RADIO FREQUENCY CIRCUIT

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/696,241

(22) Filed: Sep. 6, 2017

(65) Prior Publication Data

US 2018/0192320 A1 Jul. 5, 2018

Related U.S. Application Data

(60) Provisional application No. 62/439,984, filed on Dec. 29, 2016.

(51) Int. Cl.
| | |
|---|---|
| *H04B 1/00* | (2006.01) |
| *H04W 28/04* | (2009.01) |
| *H04B 1/44* | (2006.01) |

(52) U.S. Cl.
CPC ............ *H04W 28/04* (2013.01); *H04B 1/005* (2013.01); *H04B 1/44* (2013.01)

(58) Field of Classification Search
CPC .......... H04B 1/10; H04B 1/1027; H04B 1/12; H04B 1/16–302; H04B 1/38
See application file for complete search history.

(56) References Cited

U.S. PATENT DOCUMENTS

| | | | |
|---|---|---|---|
| 6,185,182 B1 * | 2/2001 | Meredith ................. | H01Q 3/26 370/210 |
| 6,766,262 B2 * | 7/2004 | Martens ................. | G01R 23/20 455/423 |
| 7,295,814 B2 | 11/2007 | Yamashita et al. | |
| 7,471,930 B2 | 12/2008 | Okuyama et al. | |
| (Continued) | | | |

OTHER PUBLICATIONS

Advisory Action for U.S. Appl. No. 15/332,676, dated Jun. 14, 2018, 3 pages.

(Continued)

*Primary Examiner* — Un C Cho
*Assistant Examiner* — Kenan Cehic
(74) *Attorney, Agent, or Firm* — Withrow & Terranova, P.L.L.C.

(57) ABSTRACT

Embodiments of the disclosure relate to reducing intermodulation distortion (IMD) in a radio frequency (RF) circuit. In examples discussed herein, the RF circuit operates in an uplink carrier aggregation (ULCA) mode to transmit an RF uplink signal simultaneously in a first uplink band and a second transmit band. However, nonlinear components in the RF circuit can create an IMD product(s) that can fall into a downlink band of an RF downlink signal, thus impairing a receive filter's ability to receive the RF downlink signal in the downlink band. The receive filter can be opportunistically reconfigured to form an IMD shunt path to attenuate the IMD product. By reconfiguring the receiver filter to form the IMD shunt path, it is possible to suppress the IMD product in the RF uplink signal, thus leading to an improved desense performance in the ULCA mode without incurring additional cost and/or battery life penalty.

18 Claims, 5 Drawing Sheets

(56) References Cited

U.S. PATENT DOCUMENTS

| | | |
|---|---|---|
| 7,501,912 B2 | 3/2009 | Jamneala et al. |
| 7,512,388 B2 | 3/2009 | Snider |
| 7,596,357 B2 | 9/2009 | Nakamata et al. |
| 7,711,389 B2 | 5/2010 | Furutani et al. |
| 7,756,486 B1 | 7/2010 | Tan et al. |
| 7,872,547 B2 | 1/2011 | Song et al. |
| 7,885,613 B2 | 2/2011 | Kemmochi et al. |
| 8,558,641 B2 | 10/2013 | Murase et al. |
| 8,582,547 B2 | 11/2013 | Kemmochi et al. |
| 8,680,944 B2 | 3/2014 | Ye et al. |
| 8,706,056 B2 | 4/2014 | Saji et al. |
| 8,918,063 B2 | 12/2014 | Song et al. |
| 9,124,355 B2 | 9/2015 | Black et al. |
| 9,263,793 B2 | 2/2016 | Dupuy et al. |
| 9,853,683 B2 | 12/2017 | Khlat et al. |
| 2001/0021644 A1* | 9/2001 | Jang .................. H03G 1/0088 455/295 |
| 2002/0183016 A1 | 12/2002 | Kemmochi et al. |
| 2004/0102172 A1 | 5/2004 | Hendin |
| 2007/0075803 A1 | 4/2007 | Kemmochi et al. |
| 2007/0105519 A1* | 5/2007 | Perkins ................ H03D 3/008 455/295 |
| 2007/0229189 A1 | 10/2007 | Iwata |
| 2008/0231387 A1 | 9/2008 | Nagai |
| 2012/0238230 A1* | 9/2012 | Tombak ................ H03H 11/16 455/295 |
| 2013/0154868 A1* | 6/2013 | Kehrer .................. H04B 1/109 342/16 |
| 2014/0011463 A1* | 1/2014 | Madan ..................... H04B 1/44 455/78 |
| 2014/0327578 A1* | 11/2014 | Rowson ................... H04B 7/04 342/368 |
| 2014/0376534 A1* | 12/2014 | Pajona ................ H04W 24/02 370/338 |
| 2015/0065124 A1* | 3/2015 | Kim ....................... H04B 1/525 455/426.1 |
| 2015/0091653 A1 | 4/2015 | Kobayashi et al. |
| 2015/0223083 A1* | 8/2015 | Maca ................. H04B 17/0085 370/246 |
| 2015/0295559 A1 | 10/2015 | White et al. |
| 2016/0079650 A1 | 3/2016 | Solomko et al. |
| 2017/0047949 A1* | 2/2017 | Notargiacomo ..... H04B 1/0053 |
| 2017/0070405 A1 | 3/2017 | Hashemi et al. |
| 2017/0117933 A1 | 4/2017 | Khlat et al. |
| 2017/0125892 A1* | 5/2017 | Arbabian ............... A61B 5/686 |
| 2017/0201290 A1 | 7/2017 | Granger-Jones et al. |
| 2018/0024175 A1* | 1/2018 | Quan ..................... H04R 29/00 398/193 |
| 2018/0048294 A1* | 2/2018 | Gathman .................. H03F 3/19 |
| 2018/0091186 A1* | 3/2018 | Lim ....................... H04B 1/005 |
| 2018/0248627 A1* | 8/2018 | Daniel ............. H04B 10/25753 |

OTHER PUBLICATIONS

Non-Final Office Action for U.S. Appl. No. 15/332,676, dated Apr. 4, 2017, 9 pages.
Final Office Action for U.S. Appl. No. 15/332,676, dated Aug. 9, 2017, 10 pages.
Advisory Action for U.S. Appl. No. 15/332,676, dated Oct. 18, 2017, 2 pages.
Non-Final Office Action for U.S. Appl. No. 15/332,676, dated Nov. 9, 2017, 9 pages.
Final Office Action for U.S. Appl. No. 15/332,676, dated Mar. 8, 2018, 10 pages.
Non-Final Office Action for U.S. Appl. No. 15/404,584, dated Nov. 2, 2017, 10 pages.
Notice of Allowance for U.S. Appl. No. 15/404,584, dated Feb. 8, 2018, 7 pages.
Final Office Action for U.S. Appl. No. 15/332,676, dated Mar. 21, 2019, 11 pages.
Non-Final Office Action for U.S. Appl. No. 15/332,676, dated Oct. 2, 2018, 11 pages.
Notice of Allowance for U.S. Appl. No. 15/332,676, dated Jul. 22, 2019, 7 pages.

* cited by examiner

REDUCING INTERMODULATION DISTORTION IN A RADIO FREQUENCY CIRCUIT

RELATED APPLICATIONS

This application claims the benefit of U.S. Provisional Patent Application Ser. No. 62/439,984, filed on Dec. 29, 2016, which is incorporated herein by reference in its entirety.

FIELD OF THE DISCLOSURE

The technology of the disclosure relates generally to radio frequency (RF) circuits supporting uplink carrier aggregation (ULCA).

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as long-term evolution (LTE). Particularly in light of carrier aggregation (CA) schemes supported by modern cellular communications networks, a mobile communication device can be configured to simultaneously transmit an outgoing radio frequency (RF) signal(s) in multiple uplink frequency bands, while receiving an incoming RF signal(s) in multiple downlink frequency bands. Support for the multiple frequency bands is provided by multiple radio front-ends, each supporting one or more frequency bands. The radio front-ends are connected to a common antenna via a multiplexer (e.g., a diplexer for the dual-band scenario or a triplexer for a tri-band scenario).

However, the mobile communication device may employ many nonlinear components/circuitries (e.g., power amplifier, filter, multiplexer, and switch) in a transmission path of the outgoing RF signal(s). As a result, the nonlinear elements/circuitries can create an intermodulation distortion (IMD) product(s) in the outgoing RF signal(s). Moreover, the IMD product(s) may fall into an adjacent downlink frequency band for receiving the incoming RF signal(s), thus causing degradation in the incoming RF signal(s). For example, in an uplink CA (ULCA) mode, the mobile communication device may simultaneously transmit the outgoing RF signal(s) in LTE uplink band one (1) (1920-1980 MHz) and LTE uplink band three (3) (1710-1785 MHz), while receiving the incoming RF signal(s) in LTE downlink band 1 (2110-2170 MHz) and LTE downlink band 3 (1805-1880 MHz). In this regard, a third-order IMD (IMD3) product may be created through intermodulation between the outgoing RF signal(s) transmitted in LTE uplink bands 1 and 3, which falls into the frequency range of LTE downlink band 1. As a result, the mobile communication device(s) may have difficulty in receiving the incoming RF signal in LTE downlink band 1. Notably, similar issue may also exist between LTE band twenty-five (25) and band sixty-six (66). In this regard, it may be necessary to sufficiently suppress the IMD product(s) in the mobile communication device to achieve desirable user experiences.

SUMMARY

Embodiments of the disclosure relate to reducing intermodulation distortion (IMD) in a radio frequency (RF) circuit. In examples discussed herein, the RF circuit operates in an uplink carrier aggregation (ULCA) mode to transmit an RF uplink signal simultaneously in a first uplink band and a second transmit band. However, nonlinear components (e.g., power amplifier, filter, and switch) in the RF circuit can create an IMD product(s) that can fall into a downlink band of an RF downlink signal, thus impairing a receive filter's ability to receive the RF downlink signal in the downlink band. In this regard, the receive filter can be opportunistically reconfigured to form an IMD shunt path to attenuate the IMD product in the RF uplink signal. In a non-limiting example, the receiver filter impaired by the IMD product(s) is configured to function as an IMD bandstop filter to subtract the IMD product from the RF uplink signal. By forming the IMD shunt path, it is possible to suppress the IMD product in the RF uplink signal, thus leading to an improved desense performance in the ULCA mode without incurring additional cost and/or battery life penalty.

In one aspect, an RF circuit is provided. The RF circuit includes a common node coupled to an antenna. The RF circuit also includes multiplexer circuitry coupled to the common node and comprises a first transmit filter, a second transmit filter, and a first receive filter. The first transmit filter is configured to provide an RF uplink signal in a first uplink band to the common node in a ULCA mode. The second transmit filter is configured to provide the RF uplink signal in a second uplink band to the common node in the ULCA mode. The first receive filter is configured to receive an RF downlink signal in a first downlink band from the common node. At the common node, the RF uplink signal comprises an IMD product that falls within the first downlink band. The RF circuit also includes tunable reflection circuitry. The RF circuit also includes control circuitry configured to control the tunable reflection circuitry to form an IMD shunt path from the common node to a ground through the first receive filter and the tunable reflection circuitry to attenuate the IMD product in the RF uplink signal in the ULCA mode.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to reducing intermodulation distortion (IMD) in a radio frequency (RF) circuit. In examples discussed herein, the RF circuit operates in an uplink carrier aggregation (ULCA) mode to transmit an RF uplink signal simultaneously in a first uplink band and a second transmit band. However, nonlinear components (e.g., power amplifier, filter, and switch) in the RF circuit can create an IMD product(s) that can fall into a downlink band of an RF downlink signal, thus impairing a receive filter's ability to receive the RF downlink signal in the downlink band. In this regard, the receive filter can be opportunistically reconfigured to form an IMD shunt path to attenuate the IMD product in the RF uplink signal. In a non-limiting example, the receiver filter impaired by the IMD product(s) is configured to function as an IMD bandstop filter to subtract the IMD product from the RF uplink signal. By forming the IMD shunt path, it is possible to suppress the IMD product in the RF uplink signal, thus leading to an improved desense performance in the ULCA mode without incurring additional cost and/or battery life penalty.

Figure 1:
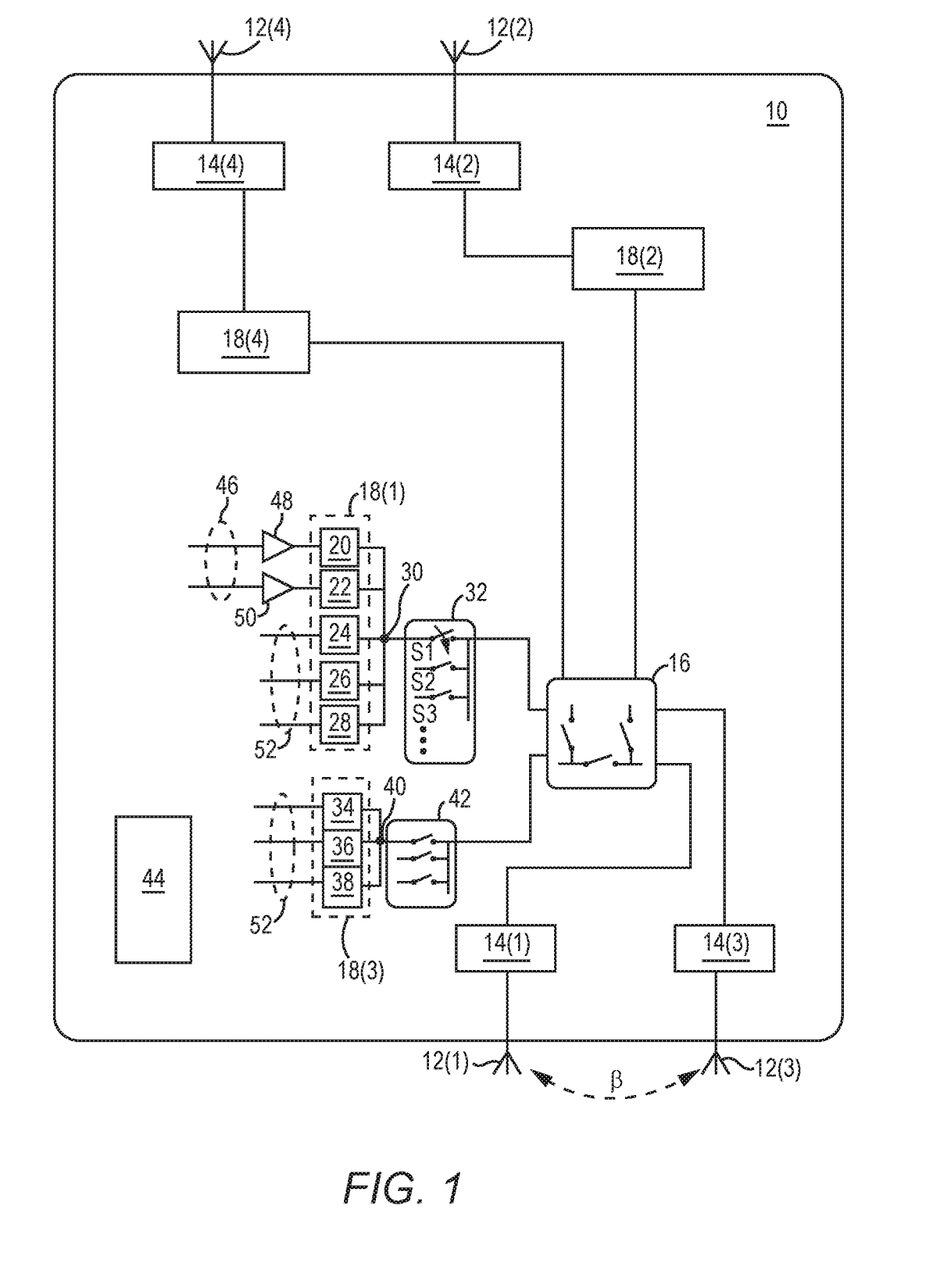
FIG. 1 is a schematic diagram of an exemplary radio frequency (RF) circuit that may be impacted by intermodulation distortion (IMD) when operating in an uplink carrier aggregation (ULCA) mode.

Before discussing exemplary aspects of reducing IMD in an RF circuit, a brief discussion of the IMD issue that may exist in an RF circuit is first provided with reference to FIG. 1. The discussion of specific exemplary aspects of reducing IMD in an RF circuit starts below with reference to FIG. 2.

In this regard, FIG. 1 is a schematic diagram of an exemplary RF circuit 10 that may be impacted by IMD when operating in a ULCA mode. The RF circuit 10 includes a plurality of antennas 12(1)-12(4). The RF circuit 10 includes a plurality of RF front end modules (FEMs) 14(1)-14(4) coupled to the antennas 12(1)-12(4), respectively. The RF circuit 10 also includes antenna-swapping circuitry 16 that can be dynamically configured and/or controlled to select one or more of the antennas 12(1)-12(4) for transmitting and/or receiving RF communication signals. In this regard, the RF circuit 10 can be dynamically configured to operate in a multiple-input multiple-output (MIMO) mode and/or the ULCA mode.

The RF circuit 10 includes a plurality of multiplexer circuitries 18(1)-18(4) configured to be coupled with the antennas 12(1)-12(4) to support the MIMO (e.g., 4×4 MIMO) mode. For the convenience of illustration and discussion, the multiplexer circuitry 18(1) is shown herein as pentaplexer circuitry and the multiplexer circuitry 18(3) is shown herein as triplexer circuitry. The multiplexer circuitry 18(2) and the multiplexer circuitry 18(4) are not illustrated as particular types of multiplexers. However, it should be appreciated that the RF circuit 10 can include any number of multiplexer circuitries of any types (e.g., duplexer circuitry, triplexer circuitry, quadplexer circuitry, pentaplexer circuitry, etc.).

The multiplexer circuitry 18(1) includes a first transmit filter 20, a second transmit filter 22, a first receive filter 24, a second receive filter 26, and a third receive filter 28 that are coupled to a common node 30. The common node 30 is coupled to switching circuitry 32, which includes switches $S_1$, $S_2$, $S_3$, and so on. The switching circuitry 32 is coupled to the antenna-swapping circuitry 16. In this regard, the common node 30 can be coupled to any one or more of the antennas 12(1)-12(4) via the switching circuitry 32 and the antenna-swapping circuitry 16.

The multiplexer circuitry 18(3) (second multiplexer circuitry) includes a first diversity receive filter 34, a second diversity receive filter 36, and a third diversity receive filter 38 that are coupled to a second common node 40. The second common node 40 is coupled to second switching circuitry 42 and the second switching circuitry 42 is coupled to the antenna-swapping circuitry 16. Notably, the second common node 40 can be coupled to any one or more of the antennas 12(1)-12(4) via the second switching circuitry 42 and the antenna-swapping circuitry 16.

The RF circuit 10 includes control circuitry 44, which can be a microprocessor, a microcontroller, or a field-programmable gate array (FPGA) for example. The control circuitry 44 may be coupled to the multiplexer circuitries 18(1)-18(4), the switching circuitry 32, the second switching circuitry 42, and the antenna-swapping circuitry 16. Accordingly, the control circuitry 44 may dynamically configure the RF circuit 10 to operate in the ULCA mode and/or the MIMO mode.

When the RF circuit 10 operates in the ULCA mode, the first transmit filter 20 and the second transmit filter 22 are configured to transmit an RF uplink signal 46 simultaneously in a first uplink band and a second uplink band. In this regard, the ULCA mode can also be referred to as an interband ULCA mode. In this regard, the control circuitry 44 may control the switching circuitry 32 (e.g., closes the switch $S_1$ and opens the switches $S_2$, $S_3$) and the antenna-swapping circuitry 16 to couple the common node 30 to the antenna 12(1) for transmission of the RF uplink signal 46. The RF uplink signal 46 may be amplified by power amplifiers 48, 50 prior to being provided to the first transmit filter 20 and the second transmit filter 22.

As the common node 30 is coupled to the antenna 12(1), the multiplexer circuitry 18(1) can also receive an RF downlink signal 52 either based on frequency-division duplex (FDD) or time-division duplex (TDD). More specifically, the first receive filter 24 can receive the RF downlink signal 52 in a first downlink band and the second receive filter 26 can receive the RF downlink signal 52 in a second downlink band.

Concurrently, the control circuitry 44 may control the second switching circuitry 42 and the antenna-swapping circuitry 16 to couple the second common node 40 to the antenna 12(3). As such, the first diversity receive filter 34 and the second diversity receive filter 36 can concurrently receive the RF downlink signal 52 in the first downlink band and the second downlink band, respectively. In this regard, the RF circuit 10 operates concurrently in the ULCA mode and the MIMO mode.

In a non-limiting example, the first uplink band and the second uplink band can be long-term evolution (LTE) uplink band one (1) and LTE uplink band three (3), respectively. Accordingly, the first uplink band (LTE uplink band 1) is between 1920-1985 MHz with a first center frequency $f_1$ at 1950 MHz. The second uplink band (LTE uplink band 3) is between 1710-1780 MHz with a second center frequency $f_2$ at 1745 MHz. The first downlink band (LTE downlink band 1) is between 2110-2170 MHz and the second downlink band (LTE downlink band 3) is between 1805-1880 MHz.

The RF uplink signal 46 propagates through the power amplifiers 48, 50, the first transmit filter 20, and the second transmit filter 22 to arrive at the common node 30. Given that the power amplifiers 48, 50, the first transmit filter 20, and/or the second transmit filter 22 may not be perfectly linear, the RF uplink signal 46 may be distorted when arriving at the common node 30. One commonly known distortion that can be added to the RF uplink signal 46 by the nonlinear components and/or circuitries is the IMD, which can create a plurality of IMD products in the RF uplink signal 46. Among the IMD products, the third-order IMD product (IMD3) can be particularly problematic to the first receive filter 24 and/or the second receive filter 26 in the multiplexer circuitry 18(1).

In a non-limiting example, when the RF uplink signal 46 in LTE uplink band 1 ($f_1$=1950 MHz) is combined with the RF uplink signal 46 in LTE uplink band 3 ($f_2$=1745 MHz) at the common node 30, a pair of mirrored IMD3s may be created at frequencies 1540 MHz and 2155 MHz, respectively. As such, the IMD3 created at 2155 MHz would fall within the LTE downlink band 1 (2110-2170 MHz). The IMD3 can contribute a raised noise floor in LTE downlink band 1. As a result, the first receive filter 24 may be desensed by the IMD3 and thus unable to correctly detect and process the RF downlink signal 52 in LTE downlink band 1. Similar problems may also exist between LTE uplink and downlink bands twenty-five (25) and sixty-six (66).

Although, the RF circuit 10 may still be able to receive the RF downlink signal 52 in the LTE downlink band 1 via the antenna 12(3) and the first diversity receive filter 34, it is possible that the RF downlink signal 52 received by the first diversity receive filter 34 is also negatively impacted by the IMD3 in the RF uplink signal 46. For example, the antenna 12(3) and the antenna 12(1) can be disposed in close proximity (e.g., side-by-side in a smartphone form factor). As such, there may not be sufficient special separation between the antenna 12(1) and the antenna 12(3). In this regard, unless a higher level of RF separation is provided between the antenna 12(1) and the antenna 12(3), the antenna 12(3) can be negatively impacted by the IMD3 due to antenna coupling 13 (e.g., at least −15 dB) between the antenna 12(1) and the antenna 12(3). Notably, adding a higher level of RF separation between the antenna 12(1) and the antenna 12(3) can lead to increased costs of the RF circuit 10.

Furthermore, it can be very difficult to suppress the IMD3 in the RF uplink signal 46 to a desirable level (e.g., −110 dBm) via improving linearity of the first transmit filter 20 and/or the second transmit filter 22 without significantly increasing costs of the RF circuit 10. For example, the RF uplink signal 46 is transmitted simultaneously at +23.5 dBm in the first uplink band and the second uplink band. The multiplexer circuitry 18(1) may have a third-order intercept point (IIP3) at +84 dBm. Accordingly, the IMD3 in the RF uplink signal 46 would be at −97.5 dBm (2×23.5 dBm+23.5 dBm−2×84 dBm), which is significantly higher than the desirable level of −110 dBm. In this regard, to suppress the IMD3 to the desired level of −110 dBm, the IIP3 of the multiplexer circuitry 18(1) would need to be at least +90.5 dBm, which would be very difficult to achieve even if the first transmit filter 20 and the second transmit filter 22 are perfectly linear. As such, it may be desirable to suppress the IMD product in the RF uplink signal 46 without changing existing hardware and/or adding additional hardware in the RF circuit 10.

Figure 2:
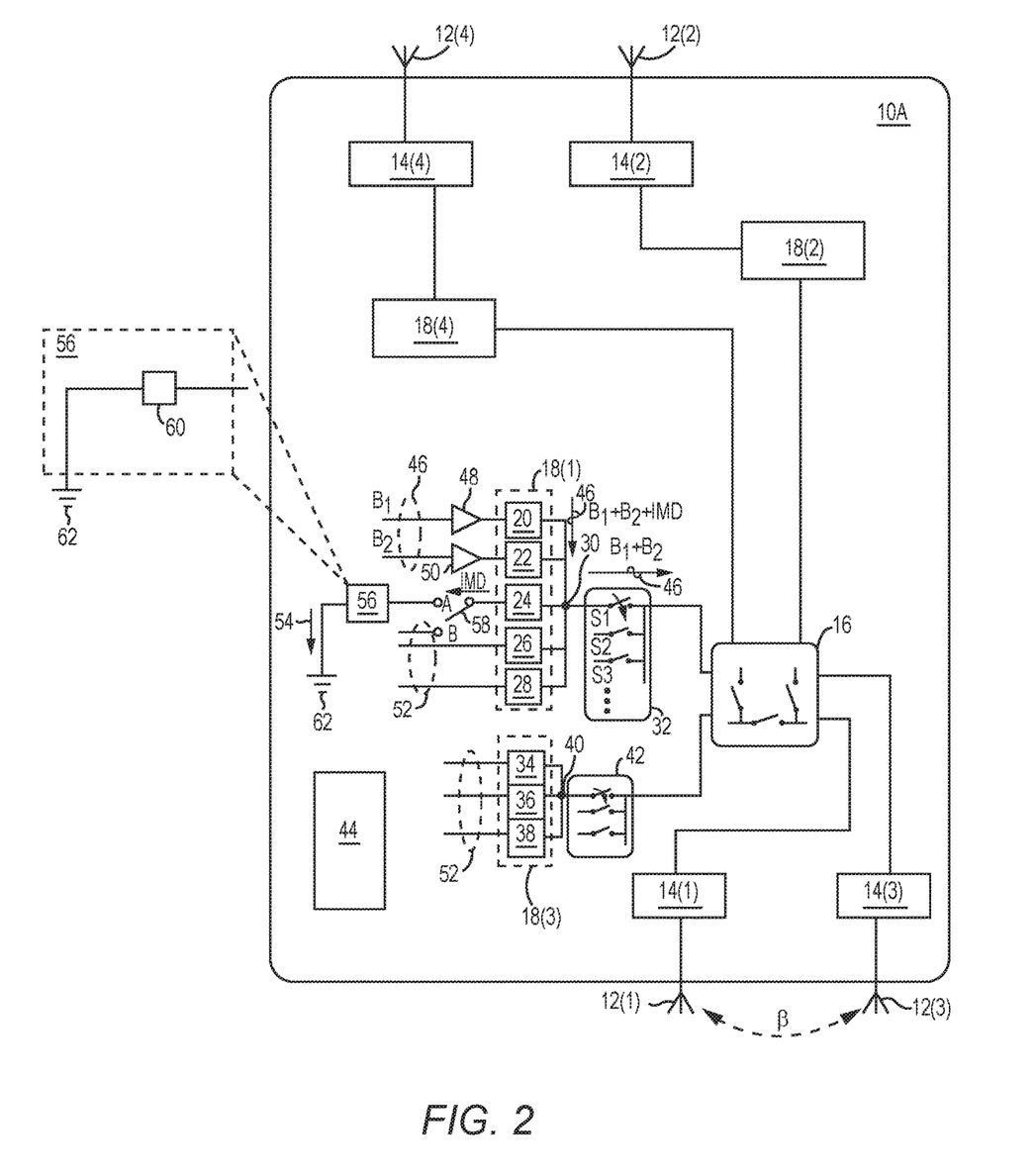
FIG. 2 is a schematic diagram of an exemplary RF circuit configured to reduce the IMD by forming an IMD shunt path in the ULCA mode.

In this regard, FIG. 2 is a schematic diagram of an exemplary RF circuit 10A configured to reduce the IMD product in the RF uplink signal 46 of FIG. 1 by reconfiguring the first transmit filter 20 of FIG. 1 to form an IMD shunt path 54 in the ULCA mode. Notably, the RF circuit 10A is configured based on the RF circuit 10 of FIG. 1 with minimum hardware change to minimize impacts on cost, footprint, and/or battery life. As such, the RF circuit 10A may be backward compatible with the RF circuit 10 of FIG. 1. Common elements between FIGS. 1 and 2 are shown therein with common element numbers and will not be re-described herein.

The RF circuit 10A includes control circuitry 44A, which can be a microprocessor, a microcontroller, or a FPGA for example. The control circuitry 44A may be backward compatible with the control circuitry 44 of FIG. 1. The RF circuit 10A can be configured to operate in the ULCA mode in which the first transmit filter 20 and second transmit filter 22 provide the RF uplink signal 46 in the first uplink band and the second uplink band, respectively, to the common node 30. Further, the switch $S_1$ is closed to couple the common node 30 to the antenna-swapping circuitry 16 and thus the antenna 12(1). As discussed in detail below, in the ULCA mode, the control circuitry 44A opportunistically reconfigures the first receive filter 24 to form the IMD shunt path 54 to attenuate the IMD product in the RF uplink signal 46. In particular, the control circuitry 44A can form the IMD shunt path 54 to attenuate the IMD3 in the RF uplink signal 46 in the ULCA mode.

The IMD shunt path 54 includes tunable reflection circuitry 56. In a non-limiting example, a shunt path switch 58, which can be a single-pole double-throw (SP2T) switch, is provided between the first receive filter 24 and the tunable reflection circuitry 56 that includes a tunable phase shifter 60.

In the ULCA mode, the control circuitry 44A dynamically closes the shunt path switch 58 to position A to couple the first receive filter 24 to the tunable reflection circuitry 56, and thus to the ground 62, to form the IMD shunt path 54. When the shunt path switch 58 is closed to position A, the IMD shunt path 54 has low impedance of approximately one ohm (1Ω). As a result, the control circuitry 44A can reconfigure the first receive filter 24 to be an IMD bandstop filter to exclusively notch out the IMD product (e.g., the IMD3). Furthermore, the control circuitry 44A can adjust the tunable phase shifter 60 and/or the first receive filter 24 to provide one or more notches for attenuating the IMD product.

As such, the IMD product can be attenuated from the RF uplink signal 46 at the common node 30. As illustrated in FIG. 2, the RF uplink signal 46 entering the common node 30 includes the RF uplink signal 46 in the first uplink band ($B_1$), the RF uplink signal 46 in the second uplink band ($B_2$), and the IMD product. The IMD shunt path 54, which extends from the common node 30 to a ground 62 through the first receive filter 24 and the tunable reflection circuitry 56, shunts away the IMD product from the common node 30 to the ground 62. As a result, the RF uplink signal 46 exiting the common node 30 would include only $B_1$ and $B_2$. In this regard, the IMD shunt path 54 attenuates the IMD product from the RF uplink signal 46.

Simulation results have shown that by forming the IMD shunt path 54 in the ULCA mode, it is possible to suppress the IMD product in the RF uplink signal 46 by approximately 8 dB. Accordingly, it would be possible to improve the IIP3 for the multiplexer circuitry 18(1) by approximately 4 dB. As a result, the IIP3 of the multiplexer circuitry 18(1) can improve from +84 dBm to approximately +88 dBm.

According to the previous discussion of FIG. 1, it would require the IIP3 of the multiplexer circuitry 18(1) to be +90.5 dBm IIP3 to suppress the IMD3 to the desired level of −110 dBm. In this regard, although the IMD shunt path 54 cannot completely eliminate the IMD product from the RF uplink signal 46, the IMD shunt path 54 can nevertheless reduce the IMD product significantly. Notably, it may be possible to suppress the IMD product to the desired level of −110 dBm by further improving linearity of the power amplifiers 48, 50, the first transmit filter 20, and/or the second transmit filter 22 in addition to providing the IMD shunt path 54.

Simulation results also show that it may be possible to improve a voltage standing wave ratio (VSWR) of the RF circuit 10A. For example, if the RF circuit 10A has a high impedance antenna port, then the IMD product as a function of voltage would be high as well. In this case, if the IMD shunt path 54 can suppress the IMD product by 9 dB, it would mean that impedance presented by the first receive filter 24 is approximately 10-160. As such, if the VSWR were 2:1, then the antenna impedance would be approximately 1000. Accordingly, net impedance at the antenna port would be 16∥100 instead of 50∥100. As a result, the first receive filter 24 with the 2:1 VSWR can provide approximately 8 dB IMD of product attenuation.

When the RF circuit 10A operates in a non-ULCA mode, the control circuitry 44A can switch the shunt path switch 58 to position B to decouple the first receive filter 24 from the tunable reflection circuitry 56 to tear down the IMD shunt path 54. In this regard, the first receive filter 24 is configured to receive the RF downlink signal 52 in the first downlink band. Notably, even when the RF circuit 10A is operating in the ULCA mode, the control circuitry 44A can still decouple the first receive filter 24 from the tunable reflection circuitry 56 if the IMD product in the RF uplink signal 46 does not interfere with any of the first downlink band and the second downlink receive band.

Reconfiguring the first receive filter 24 to form the IMD shunt path 54 in the ULCA mode does not impact the RF circuit 10A negatively with respect to receiving the RF downlink signal 52 in the first downlink band and the second downlink band. The second receive filter 26 and the second diversity receive filter 36 can continue receiving the RF downlink signal 52 in the second downlink band. Notably, it is also possible to have the additional second diversity receiver filter 36 in the multiplexer circuitries 18(2) and 18(4). As a result, the RF circuitry 10A may also receive the RF downlink signal 52 in the second downlink band via the antenna 12(2) and/or the antenna 12(4). The control circuitry 44A may configure the first diversity receive filter 34 to receive the RF downlink signal 52 in the first downlink band. Furthermore, the control circuitry 44A can configure the RF circuit 10A to utilize the antenna 12(2) and/or the antenna 12(4) to receive the RF downlink signal 52 in the first downlink band and/or the second downlink band. As such, the RF circuit 10A can support the ULCA mode and MIMO mode concurrently.

As previously discussed, the RF uplink signal 46 coming into the common node 30 includes the RF uplink signal 46 in the first uplink band ($B_1$), the RF uplink signal 46 in the second uplink band ($B_2$), and the IMD product. The IMD shunt path 54 shunts the IMD away from the common node 30 into the ground 62. As a result, the RF uplink signal 46 exiting the common node 30 would include only $B_1$ and $B_2$. However, the RF uplink signal 46 exiting the common node 30 would propagate through the switch $S_1$ to reach the antenna-swapping circuitry 16 and thereafter the antenna 12(1). Notably, the switch $S_1$ may not be perfectly linear. As a result, the switch $S_1$ may recreate the IMD product in the RF uplink signal 46. In this regard, it may be desired to suppress the IMD product created in the RF uplink signal 46 by the switch $S_1$ as well. Some alternative solutions are discussed next with references to FIGS. 3-5.

Figure 3:
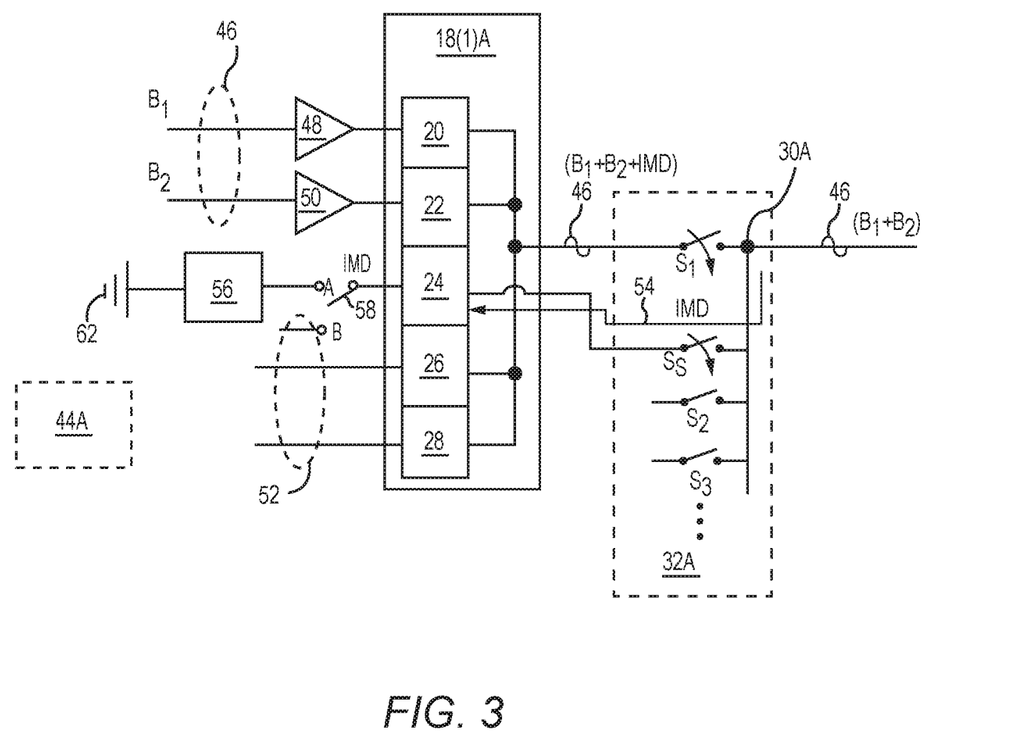
FIG. 3 is a schematic diagram of an exemplary switching circuitry that can be provided in the RF circuit of FIG. 2 to further reduce the IMD product in the ULCA mode.

In this regard, FIG. 3 is a schematic diagram of an exemplary switching circuitry 32A that can be provided in the RF circuit 10A of FIG. 2 to further reduce the IMD product in the ULCA mode. Common elements between FIGS. 2 and 3 are shown therein with common element numbers and will not be re-described herein.

As shown in FIG. 3, the switching circuitry 32A is provided between multiplexer circuitry 18(1)A and a common node 30A. In a non-limiting example, the switching circuitry 32A and the multiplexer circuitry 18(1)A can be provided in the RF circuit 10A to replace the switching circuitry 32 and the multiplexer circuitry 18(1), respectively. In contrast to the common node 30, which is located between the multiplexer circuitry 18(1) and the switching circuitry 32 in FIG. 2, the common node 30A is located after the switch $S_1$.

The first transmit filter 20, the second transmit filter 22, the second receive filter 26, and the third receive filter 28 are coupled to the common node 30A via the switch $S_1$ in the switching circuitry 32A. The switching circuitry 32A includes a shunt switch $S_S$ configured to couple the first receive filter 24 directly to the common node 30A, independent from the switch $S_1$ in the switching circuitry 32A. In this regard, in the ULCA mode, the shunt switch $S_S$ is closed to form the IMD shunt path 54.

The control circuitry 44A can control the tunable reflection circuitry 56 to adjust the input impedance of the first receive filter 24 to include impedance of the switch $S_1$. As such, the IMD shunt path 54 can shunt away the IMD product created by the power amplifiers 48, 50, the first transmit filter 20, the second transmit filter 22, as well as the switch $S_1$. As a result, the RF uplink signal 46 exiting the common node 30A would include only $B_1$ and $B_2$.

Figure 4:
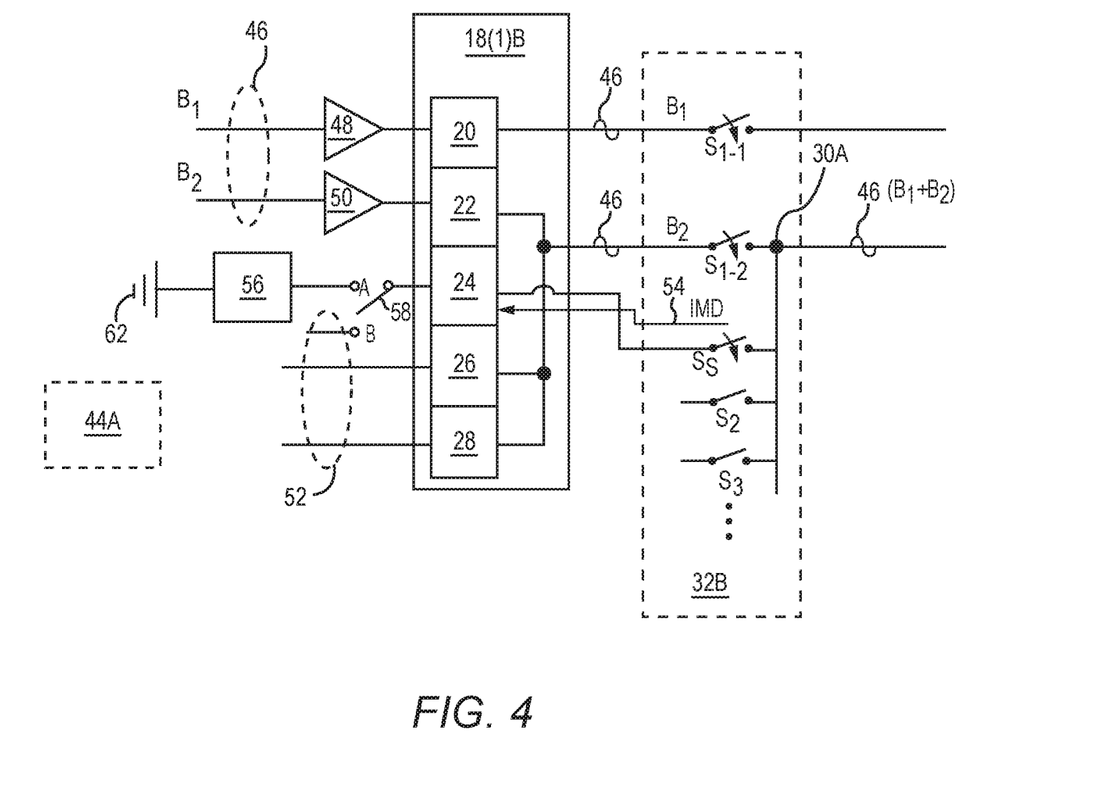
FIG. 4 is a schematic diagram of another exemplary switching circuitry that can be provided in the RF circuit of FIG. 2 to further reduce the IMD product in the ULCA mode.

FIG. 4 is a schematic diagram of another exemplary switching circuitry 32B that can be provided in the RF circuit 10A of FIG. 2 to further reduce the IMD product in the ULCA mode. Common elements between FIGS. 2, 3, and 4 are shown therein with common element numbers and will not be re-described herein.

As shown in FIG. 4, the switching circuitry 32B is provided between multiplexer circuitry 18(1)B and the common node 30A. In a non-limiting example, the switching circuitry 32B and the multiplexer circuitry 18(1)B can be provided in the RF circuit 10A to replace the switching circuitry 32 and the multiplexer circuitry 18(1), respectively. In contrast to the common node 30, which is located between the multiplexer circuitry 18(1) and the switching circuitry 32 in FIG. 2, the common node 30A is located after the switch $S_1$.

The switching circuitry 32B includes a first switch $S_{1\_1}$ and a second switch $S_{1\_2}$ coupled to the first transmit filter 20 and the second transmit filter 22, respectively. In this regard, in the ULCA mode, the control circuitry 44A closes both the switch $S_{1\_1}$ and the switch $S_{1\_2}$ to couple the first transmit filter 20 and the second transmit filter 22 to the common node 30A. The control circuitry 44A further closes the shunt switch $S_S$ to form the IMD shunt path 54 for suppressing the IMD product in the RF uplink signal 46.

Figure 5A:
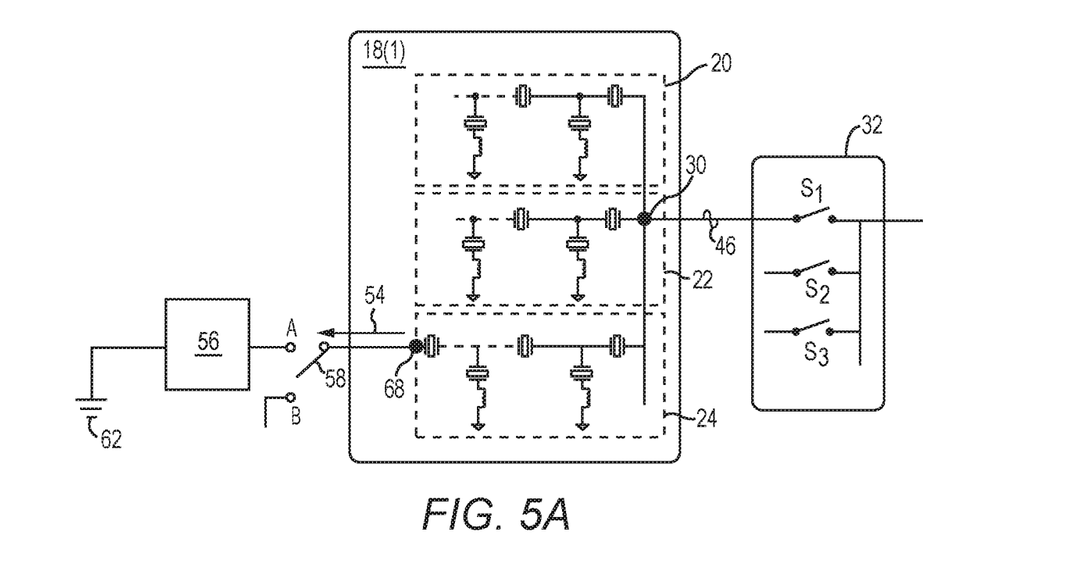
FIGS. 5A-5B are schematic diagrams providing exemplary illustrations of different ways for coupling a tunable reflection circuitry to a first receive filter in the RF circuit of FIG. 2.
Figure 5B:
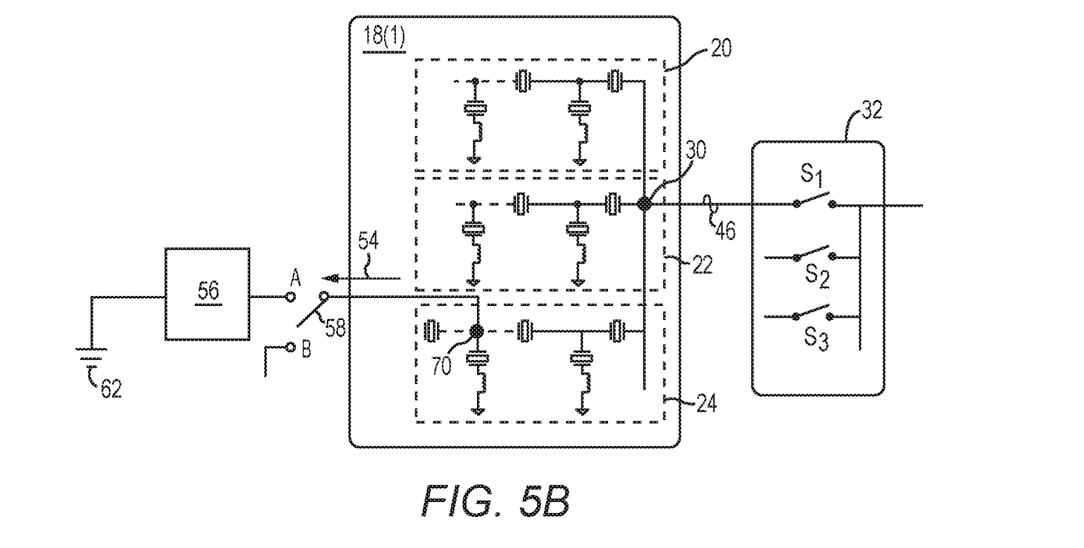

As previously discussed in FIG. 2, the control circuitry 44 couples the tunable reflection circuitry 56 to the first receive filter 24 in the ULCA mode. In this regard, FIGS. 5A-5B are schematic diagrams providing exemplary illustrations of different ways for coupling the tunable reflection circuitry 56 with the first receive filter 24 in the RF circuit 10A of FIG. 2. Common elements between FIGS. 2 and 5A-5B are shown therein with common element numbers and will not be re-described herein.

In FIG. 5A, the tunable reflection circuitry 56 is coupled to an end node 68 of the first receive filter 24. In FIG. 5B, the tunable reflection circuitry 56 is coupled to an intermediate node 70 of the first receive filter 24, which may help to reduce insertion loss of the first receive filter 24.

Those skilled in the art will recognize improvements and modifications to the preferred embodiments of the present disclosure. All such improvements and modifications are considered within the scope of the concepts disclosed herein and the claims that follow.

What is claimed is:
1. A radio frequency (RF) circuit comprising:
a common node coupled to an antenna;
multiplexer circuitry coupled to the common node and comprising a first transmit filter, a second transmit filter, and a first receive filter, wherein:
the first transmit filter is configured to provide an RF uplink signal in a first uplink band to the common node in an uplink carrier aggregation (ULCA) mode;
the second transmit filter is configured to provide the RF uplink signal in a second uplink band to the common node in the ULCA mode;
the first receive filter is configured to receive an RF downlink signal in a first downlink band from the common node; and
at the common node, the RF uplink signal comprises an intermodulation distortion (IMD) product that falls within the first downlink band;
tunable reflection circuitry coupled to a ground;
a shunt path switch disposed between the first receive filter and the tunable reflection circuitry; and
control circuitry configured to control the shunt path switch to couple the first receive filter to the tunable reflection circuitry to form an IMD shunt path from the common node to the ground to attenuate the IMD product to the ground in the RF uplink signal in the ULCA mode.
2. The RF circuit of claim 1 wherein in the ULCA mode the control circuitry is further configured to reconfigure the first receive filter to be an IMD bandstop filter to attenuate the IMD product from the RF uplink signal.
3. The RF circuit of claim 1 wherein in the ULCA mode:
the RF uplink signal comprises a third-order IMD (IMD3) product that falls within the first downlink band; and
the control circuitry is further configured to control the tunable reflection circuitry to form the IMD shunt path to attenuate the IMD3 product in the RF uplink signal in the ULCA mode.
4. The RF circuit of claim 1 wherein:
the first uplink band is long-term evolution (LTE) uplink band one;
the second uplink band is LTE uplink band three; and
the first downlink band comprises LTE downlink band one.
5. The RF circuit of claim 1 wherein:
the first uplink band is long-term evolution (LTE) uplink band sixty-six;
the second uplink band is LTE uplink band twenty-five; and
the first downlink band is LTE downlink band sixty-six.

6. The RF circuit of claim 1 wherein the IMD shunt path comprises impedance of approximately 1 ohm.

7. The RF circuit of claim 1 wherein the control circuitry is further configured to adjust the first receive filter and the tunable reflection circuitry to provide one or more notches for attenuating the IMD product.

8. The RF circuit of claim 1 wherein in the ULCA mode the control circuitry is further configured to couple the tunable reflection circuitry to an end node of the first receive filter.

9. The RF circuit of claim 1 wherein in the ULCA mode the control circuitry is further configured to couple the tunable reflection circuitry to an intermediate node of the first receive filter.

10. The RF circuit of claim 1 wherein in a non-ULCA mode the control circuitry is further configured to control the shunt path switch to decouple the tunable reflection circuitry from the first receive filter.

11. The RF circuit of claim 1 wherein the multiplexer circuitry further comprises a second receive filter configured to receive the RF downlink signal in a second downlink band.

12. The RF circuit of claim 11 further comprising:
a second common node coupled to a second antenna; and
second multiplexer circuitry coupled to the second common node and comprising a first diversity receive filter configured to receive the RF downlink signal in the first downlink band in a multiple-input multiple-output (MIMO) mode.

13. The RF circuit of claim 12 wherein in the ULCA mode the control circuitry is further configured to reconfigure the first diversity receive filter to receive the RF downlink signal in the first downlink band.

14. The RF circuit of claim 13 wherein the second multiplexer circuitry further comprises a second diversity receive filter configured to receive the RF downlink signal in the second downlink band in the MIMO mode.

15. The RF circuit of claim 14 wherein the control circuitry is further configured to configure the second diversity receive filter to receive the RF downlink signal in the second downlink band in the ULCA mode.

16. The RF circuit of claim 12 wherein the second antenna is disposed in close proximity to the antenna.

17. The RF circuit of claim 1 further comprising switching circuitry provided between the common node and the antenna.

18. The RF circuit of claim 1 further comprising switching circuitry provided between the multiplexer circuitry and the common node, wherein in the ULCA mode:
the first transmit filter and the second transmit filter are coupled to the common node via the switching circuitry; and
the first receive filter is coupled to the common node independent from the switching circuitry.

* * * * *

UNITED STATES PATENT AND TRADEMARK OFFICE
CERTIFICATE OF CORRECTION

PATENT NO. : 10,560,867 B2  
APPLICATION NO. : 15/696241  
DATED : February 11, 2020  
INVENTOR(S) : Nadim Khlat et al.

Page 1 of 1

It is certified that error appears in the above-identified patent and that said Letters Patent is hereby corrected as shown below:

In the Specification

In Column 6, Line 43, replace "antenna coupling 13" with --antenna coupling $\beta$--.

Signed and Sealed this  
Thirty-first Day of March, 2020

Andrei Iancu  
*Director of the United States Patent and Trademark Office*